United States Patent [19]
Abe et al.

[11] Patent Number: 5,194,229
[45] Date of Patent: * Mar. 16, 1993

[54] RESISTANCE HEATER, CATALYTIC CONVERTER AND METHOD OF OPERATING CATALYTIC CONVERTER

[75] Inventors: Fumio Abe, Handa; Takashi Harada, Nagoya; Hiroshige Mizuno, Tajimi, all of Japan

[73] Assignee: NGK Insulators, Ltd., Japan

[*] Notice: The portion of the term of this patent subsequent to Nov. 5, 2008 has been disclaimed.

[21] Appl. No.: 581,988

[22] Filed: Sep. 14, 1990

[30] Foreign Application Priority Data

Jul. 4, 1990 [JP] Japan .................................. 2-176942

[51] Int. Cl.⁵ ...................... F01N 3/10; B01D 53/36; H05B 3/10
[52] U.S. Cl. .................................... 422/174; 422/173; 422/180; 422/222
[58] Field of Search ............... 422/173, 174, 180, 222; 55/DIG. 30; 60/299, 300

[56] References Cited

U.S. PATENT DOCUMENTS

| | | | |
|---|---|---|---|
| 3,956,614 | 5/1976 | Hervert | 219/541 |
| 4,758,272 | 7/1988 | Pierotti et al. | 419/36 |
| 4,976,929 | 12/1990 | Cornelison et al. | 422/174 |

FOREIGN PATENT DOCUMENTS

| | | | |
|---|---|---|---|
| 2333092 | 1/1975 | Fed. Rep. of Germany | 422/174 |
| 8910471 | 11/1989 | PCT Int'l Appl. | |
| 2049377A | 12/1980 | United Kingdom | |

*Primary Examiner*—Robert J. Warden
*Assistant Examiner*—Stephanie Blythe
*Attorney, Agent, or Firm*—Parkhurst, Wendel & Rossi

[57] ABSTRACT

A resistance heater according to the present invention comprises a honeycomb structure having a large number of passages. The honeycomb structure is provided with at least two electrodes through which a current is supplied thereto. The honeycomb structure also has a means to attain a current density of 5 A/mm² or above between the electrodes such as slits within the honeycomb structure. A current is supplied between the electrodes at a current density of 5 A/mm² or above.

10 Claims, 2 Drawing Sheets

5,194,229

RESISTANCE HEATER, CATALYTIC CONVERTER AND METHOD OF OPERATING CATALYTIC CONVERTER

BACKGROUND OF THE INVENTION

1. Field of the Invention

The present invention relates to a resistance and a catalytic converter which are suitable for use in automotive exhaust emission control, and a method of operating such a catalytic converter.

2. Description of the Related Art

Catalytic converters for use in controlling automotive exhaust gas must have a predetermined temperature or above when operated so as to make its catalyst do catalytic action. Hence, the catalyst must be heated when the temperature thereof is not sufficiently high, i.e., at the beginning of running of a vehicle.

Such techniques for heating the catalyst have been proposed in, for example, Japanese Utility Model Laid-Open No. 67609/1988. This disclosed technique is a catalytic converter comprised of a main monolithic catalyst and a metal monolithic catalyst disposed upstream of and adjacent to the main ceramic monolithic catalyst. The metal monolithic catalyst comprises an electrically conductive metal substrate with alumina coated thereon.

However, in the catalytic converter disclosed in Japanese Utility Model Laid-Open No. 67609/1988, the metal monolithic catalyst, a preheater, disposed upstream and adjacent to the main monolithic catalyst comprises a foil-type metal honeycomb structure which is constructed such that a current is supplied from the inner periphery thereof to the outer periphery thereof to generate heat. The resistance of the metal monolithic catalyst is not adjusted (i.e., only the material, dimensions and rib thickness of the metal honeycomb structure as defined and no adjustment is made on the resistance of the metal honeycomb structure), and the metal monolithic catalyst thus exhibits insufficient temperature rising characteristics. Furthermore, since the electrodes are provided in the inner peripheral portion of the metal honeycomb structure, the central portion thereof does not act as a catalyst, and pressure loss is generated. Furthermore, the electrodes readily break due to the flow of exhaust gas.

SUMMARY OF THE INVENTION

Accordingly, an object of the present invention is to provide a resistance adjusting type heater (or resistive heater) and a catalytic converter which enable the aforementioned problems of the conventional techniques to be solved, and a method of operating such a catalytic converter.

To this end, the present invention provides a resistance adjusting type heater which comprises a honeycomb structure having a large number of passages, the honeycomb structure having at least two electrodes through which a current is supplied to the honeycomb structure, the honeycomb structure having a resistance adjusting means which attains a current density of 5 A/mm$^2$ or above between the electrodes.

In this heater, a catalyst may be placed on the honeycomb structure.

The present invention further provides a catalytic converter which comprises a honeycomb structure having a large number of passages, the honeycomb structure having a catalyst carried thereon, the honeycomb structure having at least two electrodes through which a current is supplied to the honeycomb structure, the honeycomb structure having a resistance adjusting means which attains a current density of 5 A/mm$^2$ or above between the electrodes.

The present invention further provides a catalytic converter which includes a heater which is disposed upstream of a main monolithic catalyst or between main monolithic catalysts. The heater comprises a honeycomb structure having a large number of passages. The honeycomb structure has at least two electrodes thereof through which a current is supplied thereto. The honeycomb structure has a resistance adjusting means which attains a current density of 5 A/mm$^2$ or above between the electrodes. The present invention also provides a catalytic converter which includes a heater disposed downstream of a main monolithic catalyst. The heater comprises a honeycomb structure having a large number of passages. The honeycomb structure has a catalyst carried thereon. The honeycomb structure has at least two electrodes thereon through which a current is supplied thereto. The honeycomb structure has a resistance adjusting means which attains a current density of 5 A/mm$^2$ or above between the electrodes.

Preferably, the honeycomb structure is manufactured by forming metal powders into a honeycomb configuration by extrusion and then by sintering the formed honeycomb body.

The present invention further provides a method of operating a catalytic converter mentioned above which comprises steps of supplying a current between the electrodes at a current density of 5 A/mm$^2$ or above substantially concurrently with the operation of an engine, and reducing the level of power supplied to the heater when the temperature of the heater reaches a value at which a main monolithic catalyst or a catalyst carried on the heater starts activating.

DETAILED DESCRIPTION OF THE INVENTION

In the resistance adjusting type heater according to the present invention, the honeycomb structure having a large number of passages has at least two electrodes through which a current is supplied thereto. The honeycomb structure also has a resistance adjusting means which attains a current density of 5 A/mm$^2$ or above between the electrodes.

In the heater comprising a honeycomb structure with a resistance adjusting means provided between the electrodes in such a manner that a current density of 5 A/mm$^2$ or above is obtained, low-temperature automotive exhaust emissions at the beginning of the operation of an engine or the like can be quickly heated, and a high exhaust gas conversion can thus be achieved.

In the present invention, current is supplied between the electrodes at a current density of 5 A/mm$^2$ or above.

In this way, the rate at which the temperature of the heater is raised increases, enabling the exhaust emissions at the beginning of the operation of the engine to be controlled. That is, the temperature of the heater reaches 300° C. or above within ten seconds. This allows the main catalyst and the catalyst carried on the heater to function effectively.

Supply of current at a current density of 8 A/mm$^2$ or above enables the temperature of the heater to reach 300° C. or above within five seconds, and is therefore more preferable. Supply of current at a current density of 30 A/mm$^2$ or above requires a large amount of power, raises the temperature of the catalyst carried on the heater to too high a value, and is therefore undesirable from the viewpoint of durability of the catalyst.

The temperature at which the main monolithic catalyst or the catalyst carried on the heater functions is generally 300° C. or above. In a practical operation, the temperature at the outlet of the heater or converter is measured, and power supplied to the heater is adjusted such that the heater or converter is heated to 300° C. or above.

Figure 1A:
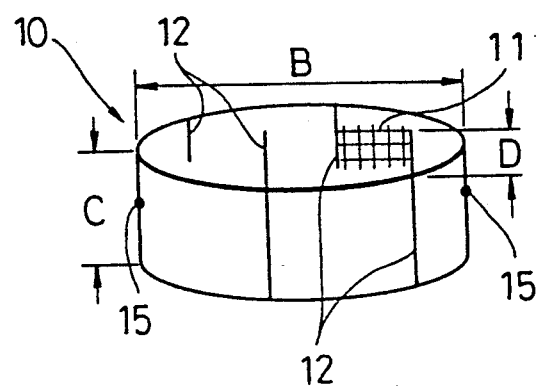
FIG. 1(a) is a perspective view of an example of a resistance adjusting type heater according to the present invention.
Figure 1B:
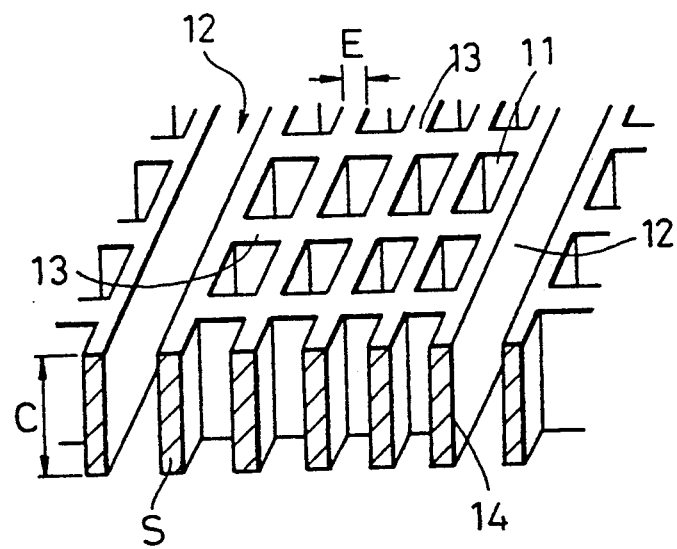
FIG. 1(b) is an enlarged perspective view of the essential parts of the heater of FIG. 1(a)

In the present invention, the term, "current density" is defined as follows:

In a resistance adjusting type heater comprising a honeycomb structure 10 having a large number of passages 11 and a predetermined number of slits 12 which serve as the resistance adjusting means, as shown in FIGS. 1(a) and 1(b), when the cross-sectional area (rib thickness (E)×length of heater (C)) of a cross-section 14 of a cell wall (rib) 13 is S, a number of ribs between the adjacent slits is n (e.g., n=5 in the case of the heater shown in FIG. 1(b)) and the current which flows through the heater is I, the current density is given by I/(S×n).

The catalytic converter comprised of the above-described resistance adjusting type heater and the main catalyst will be operated in the manner described below when it is used to control automotive exhaust emissions. The heater is energized at a current density of 5 A/mm$^2$ or above at least for sixty seconds after the engine is started to quickly heat the low-temperature exhaust gas at the beginning of the operation of an engine. If the current density is below 5 A/mm$^2$, the heater must be preheated before the engine is started to obtain desired exhaust gas conversion characteristics. Therefore, this is not practical.

The heater is energized at a current density of 5 A/mm$^2$ or above until it is heated to a temperature at which the catalyst carried on the heater and the main catalyst are activated (between 300° and 400° C.). Thereafter, the level of power supplied to the heater is reduced and the heater is successively energized at a reduced power level. Reduction in the power level is achieved either by turning on and off the heater or by energizing the heater at a current density which is below 5 A/mm$^2$.

The heater is energized substantially concurrently with the operation of the engine; energization of the heater may be concurrent with the operation of the engine or energized about several seconds, e.g., five seconds, before the engine starts.

Whereas any material, ceramic or metal, capable of generating heat when energized, can be used as the material of the honeycomb structure which is a basic body of the present invention, the use of metal enhances the mechanical strength and is thus preferred. Examples of such metals include stainless steel and materials having compositions of Fe-Cr-Al, Fe-Cr, Fe-Al, Fe-Ni, W-Co, and Ni-Cr. Among the above materials, Fe-Cr-Al, Fe-Cr and Fe-Al are preferred because of low cost and high resistance to heat, oxidation and corrosion. The honeycomb structure employed in the present invention may be porous or non-porous. In the case where a catalyst is carried on the honeycomb structure, however, a porous honeycomb structure is preferred because a catalyst layer can be closely adhered to such a honeycomb structure, and hardly peels off the honeycomb structure even when a difference in the thermal expansion between the honeycomb structure and the catalyst exists.

The metal honeycomb structure will be prepared in the manner described below.

First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion.

Next, the formed honeycomb body is fired in a non-oxidizing atmosphere at a temperature ranging between 1000° and 145° C. During the sintering in the non-oxidizing atmosphere containing hydrogen, the organic binder is decomposed and thereby removed with the aid of Fe or the like, which acts as a catalyst. A good sintered body (a honeycomb structure) can therefore be obtained.

Sintering at a temperature lower than 1000° C. achieves no sintering. Sintering conducted at a temperature higher than 1450° C. causes deformation the resulting sintered body and is thus undesirable.

Preferably, a heat-resistant metal oxide layer is then formed on the surface of the cell walls and the surface of the pores of the obtained honeycomb structure.

Next, a resistance adjusting mechanism of a desired form is preferably provided on the obtained honeycomb structure between the electrodes thereof, which will be described later.

The resistance adjusting mechanism provided on the honeycomb structure may take on any of the following forms:

(1) a slit or slits of any length, formed in any direction at any position
(2) variations in the length of the cell walls in the axial direction of the passages
(3) variations in the thickness (wall thickness) of the cell walls of the honeycomb structure or variations in the cell density of the honeycomb structure, or
(4) a slit or slits formed in the cell wall (rib) of the honeycomb structure.

Among the above-mentioned forms, formation of a slit or slits according to No. (1) is more preferable because it can easily control a heated portion.

Electrodes are provided generally on the outer peripheral portion of or inside of the thus-obtained metal honeycomb structure by welding or brazing to manufacture a honeycomb heater.

The term, "electrodes" is used in this application to refer to any terminal through which a voltage is applied to the heater. The electrodes therefore include the direct bonding of the outer peripheral portion of the heater to a can body and terminals for grounding.

In the case of the metal honeycomb structure which is used as a heater, the resistance thereof will be preferably held between 0.001 Ω and 0.5 Ω.

Preferably, a catalyst is placed on the surface of the thus-obtained metal honeycomb structure so as to allow heat to be generated due to reaction (oxidation) of the exhaust gas.

The catalyst supported on the surface of the metal honeycomb structure is made of a carrier having a high surface area and a catalyst activating material supported on the carrier. Typical examples of the carriers having a high surface area include $\gamma$-$Al_2O_3$, $TiO_2$, $SiO_2$-$Al_2O_3$ and perovskite. Examples of the catalytic activating materials include noble metals, such as Pt, Pd and Rh, and base metals, such as Cu, Ni, Cr and Co. The preferred catalyst comprises one in which from 10 to 100 g/$ft^3$ of Pt and/or Pd is loaded on the carrier made of $\gamma$-$Al_2O_3$.

In a resistance adjusting type heater designed for use in automotive exhaust emission control, the best mode of the configuration of the heater and that of the slits formed in that heater will be described below.

The cell wall thickness (rib thickness) of the preferred honeycomb structure ranges between 75 and 500 μm. Below 75 μm, the structure deteriorates in strength and in the life of the heater. Above 500 μm, the pressure loss is great and a large amount of power is required to raise the temperature thereof. The most preferable range is between 100 and 300 μm.

It is desirable that the honeycomb structure employed in the present invention has a cell density ranging from 100 to 400 cells/$in^2$ ($cpi^2$). More specifically, a cell density of 100 cells/$in^2$ or above is preferred from the viewpoints of the heat transfering area for heating gas flow in passages formed in the honeycomb structure and the catalyst surface area when the catalyst is carried on the honeycomb structure. Above 400 cells/$in^2$, formation of the slits is difficult, and short-circuiting readily occurs due to the insufficient distance between the ribs which form a slit.

The open frontal area of the honeycomb structure will preferably be held between 50 and 85% from the viewpoints of the pressure loss and the strength.

With too long heater length (the length of the heater in the axial direction of its passages), the cross-sectional area increases, thus requiring a large amount of current. With too short heater length, the heat transferring area and catalyst geometrical surface area became undesirably small. In a heater designed for use as a preheater disposed in advance of the main catalyst, the preferred length of the heater is about 1/20 to ⅓ of the length of the main catalyst.

Slits are formed to control the heating portion of the heater. In the case of a heater designed for use in automotive exhaust gas control, it is preferable for the heater to be heated relatively uniformly, and the slits are therefore formed such that the distance between the slit and the outer wall is larger than that between the adjacent slits.

A large number of slits formed in the heater increases the overall heating length of the heater and is therefore preferable. However, it also increases the resistance of the heater. This may result in reduction in a current density to below 5 A/$mm^2$ in the case where the voltage applied to the heater is fixed. So, the number of slits formed in the heater is determined such that it achieves a current density of 5 A/$mm^2$ or above.

The term, "honeycomb structure" is employed in this application to refer to an integral body having a large number of passages partitioned by the cell walls. The passages may have any cross-sectional form (cell shape), e.g., a circular, polygonal or corrugated form.

The present invention will further be illustrated in the following examples which are intended to be illustrative, but not limiting, of this invention.

FIG. 1(a) is a perspective view of an example of a resistance adjusting type heater according to the present invention. FIG. 1(b) is an enlarged perspective view of the essential parts of the heater of FIG. 1(a) which comprises a honeycomb structure 10 having a large number of passages 11 and a plurality of slits 12 which serve as the resistance adjusting means, the outer wall of the honeycomb structure 10 being provided with two electrodes 15. In FIG. 1(a) and FIG. 1(b), a reference numeral 13 denotes a cell wall (rib); 14, the cross-section of the rib; S, the cross-sectional area of the section 14 of all the ribs present between the adjacent slits; B, the diameter of a heater; C, the length of a heater; and D, the length of a slit.

EXAMPLE 1

Fe powder, Fe-Cr powder (in which Cr was present in a ratio of 50 wt %) and Fe-Al powder (in which Al was present in a ratio of 50 wt %), having average particle sizes of 10, 20 and 22 μm, were mixed to prepare a mixture having a composition of Fe-20 Cr-5 Al (% by wight). The obtained mixture was then blended into an organic binder (methyl cellulose), an antioxidant (oleic acid) and water to produce a readily formable body. The obtained body was then formed into honeycomb bodies having various rib thicknesses and various numbers of square cells shown in Table 1 by extrusion. The formed honeycomb structures were dried, sintered in an atmosphere of $H_2$ at 1300° C., and then subjected to heat treatment at 1000° C. in the oxidizing atmosphere to form a heat-resistant metal oxide layer. The porosity of the obtained honeycomb structures was 22% by volume and the average pore diameter thereof was 5 μm.

The obtained honeycomb structure 10 having an outer diameter of 90 mmφ were processed such that they had various heater lengths C shown in Table 1. Thereafter, a predetermined number of slits 12, having a length ranging from 50 to 70 mm, were formed in the individual honeycomb structure 10. Thereafter, two electrodes 15 were provided on the outer wall of the individual resistance adjusting type heater obtained, and then a heat-resistance inorganic adhesive of zirconia was filled in the outer peripheral portion of each slit 12 to form an insulating portion, as shown in FIG. 1(a).

EXAMPLE 2

Test of Heater Temperature Rising Characteristics

The individual heater was energized by a power source which was comprised of a single 12 V battery for use in an automobile or of two such batteries which were connected in series while an air was being supplied thereto at a rate of 0.7 $m^3$/min. At that time, the temperature of the heater was measured. Table 1 and FIG. 2 respectively show the time required for each heater to be heated to temperatures of 200° C., 300° C. and 400° C.

TABLE 1

| Heater No. | Thickness of rib (mm) | Cell density (cpi²) | Length of heater (mm) | No. of slits (pcs) | No. of ribs between adjacent slits (pcs) | Heat generating cross sectional area (mm²) | Overall heat generating length (mm) | Voltage (V) |
|---|---|---|---|---|---|---|---|---|
| Effect exerted by a difference in the number of ribs | | | | | | | | |
| 1 | 0.23 | 300 | 15 | 4 | 5 | 17.3 | 203 | 11.4 |
| 2 | 0.23 | 300 | 15 | 4 | 4 | 13.8 | 137 | 11.5 |
| 3 | 0.23 | 300 | 15 | 4 | 3 | 10.4 | 43 | 11.3 |
| Effect exerted by a difference in the number of slits | | | | | | | | |
| 4 | 0.23 | 300 | 15 | 7 | 5 | 17.3 | 420 | 22.5 |
| 5 | 0.23 | 300 | 15 | 8 | 5 | 17.3 | 412 | 22.4 |
| 6 | 0.23 | 300 | 15 | 10 | 5 | 17.3 | 510 | 22.4 |
| Effect exerted by a difference in the cell configuration | | | | | | | | |
| 7 | 0.11 | 400 | 15.6 | 5 | 9 | 15.0 | 270 | 11.5 |
| 8 | 0.15 | 400 | 15 | 5 | 6 | 13.5 | 250 | 11.5 |
| Effect exerted by a difference in the heater length | | | | | | | | |
| 9 | 0.23 | 300 | 10.0 | 4 | 8 | 18.4 | 180 | 22.5 |
| 10 | 0.23 | 300 | 23.5 | 15 | 4 | 21.6 | 870 | 22.3 |
| Comparative example | | | | | | | | |
| 5 | 0.23 | 300 | 15 | 8 | 5 | 17.3 | 420 | 11.3 |
| 6 | 0.23 | 300 | 15 | 10 | 5 | 17.3 | 510 | 11.4 |

| | Heater No. | Current (A) | Resistance (Ω) | Current density (A/mm²) | Heater temperature (time required to attain temperature) 200° C. (sec) | 300° C. (sec) | 400° C. (sec) |
|---|---|---|---|---|---|---|---|
| Effect exerted by a difference in the number of ribs | 1 | 135 | 0.084 | 7.8 | 3.0 | 5.1 | 7.5 |
| | 2 | 145 | 0.079 | 10.5 | 2.5 | 4.0 | 5.0 |
| | 3 | 165 | 0.068 | 18.3 | 0.9 | 1.7 | 2.1 |
| Effect exerted by a difference in the number of slits | 4 | 155 | 0.145 | 9.0 | 2.8 | 4.5 | 5.5 |
| | 5 | 145 | 0.154 | 8.4 | 3.0 | 4.6 | 6.0 |
| | 6 | 110 | 0.204 | 6.4 | 4.0 | 6.2 | 9.0 |
| Effect exerted by a difference in the cell configuration | 7 | 120 | 0.096 | 8.0 | 3.0 | 5.0 | 6.8 |
| | 8 | 135 | 0.085 | 10.0 | 2.7 | 4.4 | 5.3 |
| Effect exerted by a difference in the heater length | 9 | 220 | 0.102 | 12.0 | 2.4 | 3.5 | 4.7 |
| | 10 | 145 | 0.153 | 6.7 | 4.0 | 6.5 | 8.5 |
| Comparative example | 5 | 75 | 0.150 | 4.3 | 7.0 | 15.0 | 25.0 |
| | 6 | 55 | 0.207 | 3.2 | 14.0 | —* | —* |

*300° C. and 400° C. are not attained.

Figure 2:
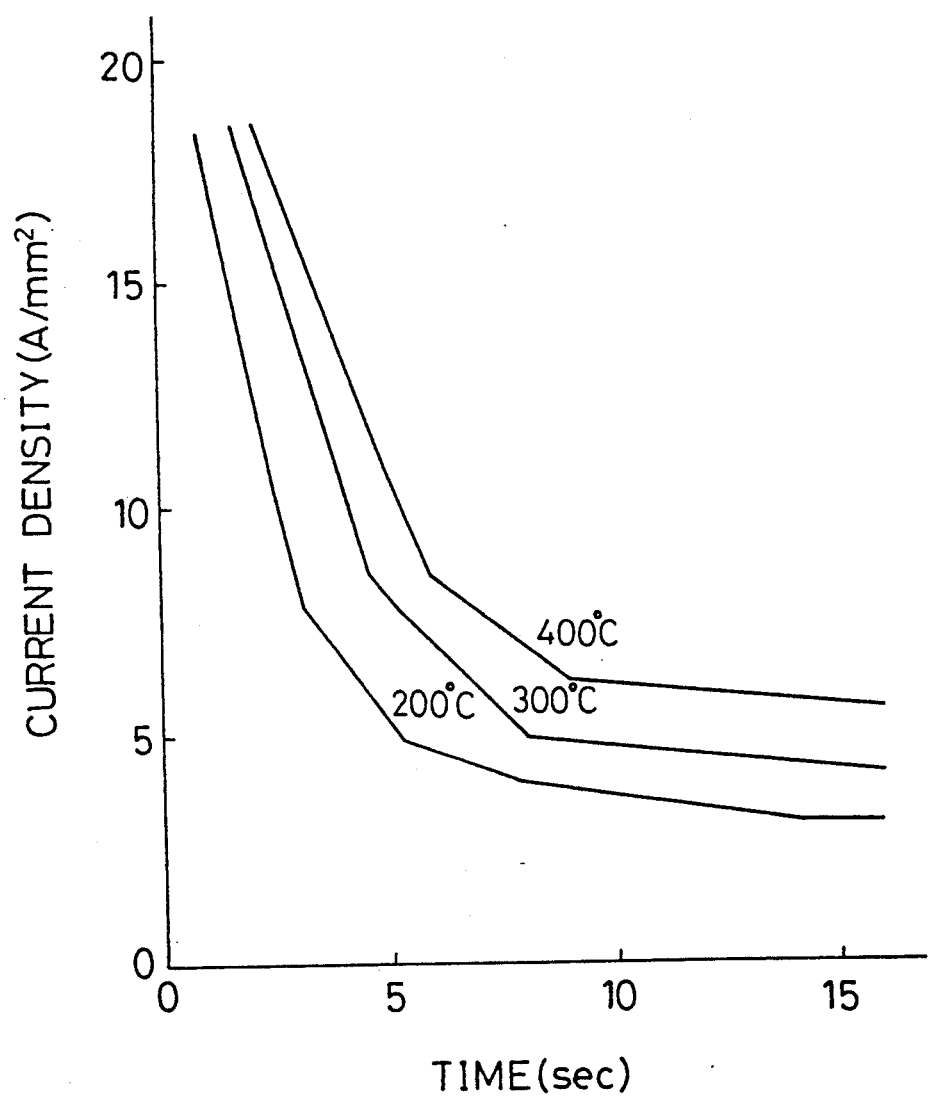
FIG. 2 is a graph showing the relation between the time required to attain a given current density and the attained current density, obtained in the heater temperature rising characteristics checking test.

As can be seen from Table 1 and FIG. 2, among the heaters having various configurations, the heaters which ensure a current density of 5 A/mm² or above can be heated to 300° C. within ten seconds.

EXAMPLE 3

Test of Performance at the Beginning of Operation of Engine

The heater No. 5 and a heater No. 11 which comprised of the heater No. 5 with a catalyst of $CeO_2$ - $\gamma$-$Al_2O_3$ (in which Pt and Pd were respectively present in an amount of 20 g/ft³) carried (coated) thereon were respectively prepared. Each of the heater Nos. 5 and 11 was disposed in advance of (upstream of) a three-way catalyst (whose rib thickness was 6 mil and whose cell density was 400 cells/in²) which was a main monolithic catalyst having an outer diameter of 90 mm$\phi$ and a length of 100 mm. Test of the performance of each of these catalytic converter systems at the beginning of the operation of an engine was conducted by operating an engine (A/F=14.6) in such a manner that the temperature thereof was raised at a fixed speed from 100° C. to 420° C. over two minutes and was then maintained at 420° C. for one minute and by measuring the conversion for CO, HC and NOx. At that time, the exhaust gas was introduced at a rate of 0.7 m³/min. Energization of the heater by two types of batteries, 24 V and 12 V, was started when the temperature of the exhaust gas reached 100° C. Thereafter, on-off control was performed on the heater so as to maintain the temperature of the heater to 450° C. Table 2 shows the obtained average conversion for the emissions.

TABLE 2

|  | Test No. | Heater No. | Voltage (V) | Initial current (A) | Current density (A/mm$^2$) | Time required for 300° C. to be reached (sec) | Average conversion rate CO | HC | NO$_x$ |
|---|---|---|---|---|---|---|---|---|---|
| Example of the present Invention | 1 | 5 | 22.4 | 145 | 8.5 | 4.5 | 66 | 52 | 64 |
|  | 2 | 11 | 22.3 | 150 | 8.7 | 4.0 | 72 | 60 | 71 |
| Example for reference | 3 | 5 | 0 | — | — | (75.0)* | 45 | 32 | 44 |
|  | 4 | 11 | 0 | — | — | (75.0)* | 48 | 35 | 47 |
| Comparative example | 5 | 5 | 11.2 | 75 | 4.3 | 14.8 | 53 | 38 | 48 |
|  | 6 | 11 | 11.3 | 75 | 4.3 | 12.0 | 58 | 44 | 52 |

*Heated by exhaust gas

As is clear from Table 2, the examples of the present invention which ensured a current density of 5 A/mm$^2$ or above exhibited better exhaust gas conversion than the comparative examples which ensured a current density of no more than 5 A/mm$^2$. Among the examples of the present invention, the catalyst of the heater No. 2 was activated at the highest degree. Heater No. 2 was turned off after it was energized about one and a half minutes because it started heat generation due to the ignition of the catalyst carried on the heater.

As will be understood from the foregoing description, in the heater and catalytic converter according to the present invention, since the resistance adjusting means is formed on the heater and catalytic converter such that it ensures a current density of 5 A/mm$^2$ or above or since the catalytic converter is operated such that it ensures a current density of 5 A/mm$^2$ or above, low-temperature automotive exhaust emissions at the beginning of the operation of an engine or the like can be quickly heated, and a high exhaust gas conversion can thus be achieved.

What is claimed is:

1. A resistance heater, comprising:
   an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and at least two electrodes in electrical contact with said honeycomb structure;
   wherein said honeycomb structure has a resistance corresponding to a current density of not less than 5 A/mm$^2$ between the electrodes.

2. A resistance heater of claim 1, wherein said honeycomb structure has a catalyst carried thereon.

3. A catalytic converter, comprising:
   an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure, said honeycomb structure having a catalyst carried thereon; and
   at least two electrodes in electrical contact with said honeycomb structure;
   wherein said honeycomb structure has a resistance corresponding to a current density of not less than 5 A/mm$^2$ between the electrodes.

4. A catalytic converter for fluid to be flowed therethrough, comprising:
   at least one main monolithic catalyst capable of being disposed in a fluid stream;
   a heater capable of being disposed in a location selected from the group consisting of upstream of said at least one main monolithic catalyst and between a plurality main monolithic catalysts, said heater comprising:
   (a) an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure; and
   (b) at least two electrodes in electrical contact with said honeycomb structure;
   (c) wherein said honeycomb structure has a resistance corresponding to a current density of not less than 5 A/mm$^2$ between the electrodes.

5. A catalytic converter of claim 4, wherein said honeycomb structure has a catalyst thereon.

6. A catalytic converter for a fluid to be flowed therethrough, comprising:
   a main monolithic catalyst capable of being disposed in a fluid stream;
   a heater capable of being disposed downstream of said main monolithic catalyst, said heater comprising:
   (a) an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which a fluid stream may pass through the honeycomb structure, and being substantially planar and extending through the axial length of said honeycomb structure and substantially parallel to said axial direction and crossing the planes of a plurality of partition walls of the honeycomb structure said honeycomb structure having a catalyst carried thereon; and (b) at least two electrodes in electrical contact with said honeycomb structure;

(c) wherein said honeycomb structure has a resistance corresponding to a current density of not less than 5 A/mm$^2$ between the electrodes.

7. A method of purifying exhaust gases from an engine, comprising the steps of:

supplying a current to a catalytic converter and flowing an exhaust gas stream therethrough, said catalytic converter having an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which said exhaust gas stream may pass through the honeycomb structure, and being substantially planar and extending through the axial length of said honeycomb structure and substantially parallel to said axial direction and crossing the planes of a plurality of partition walls of the honeycomb structure said honeycomb structure having a catalyst carried thereon; and at least two electrodes in electrical contact with said honeycomb structure, wherein said honeycomb structure has a resistance corresponding to a current density of not less than 5 A/mm$^2$ between the electrodes; and reducing a power level supplied to said honeycomb structure when a temperature of said honeycomb structure reaches a value at which said catalyst carried on said honeycomb structure is activated.

8. A method of purifying exhaust gases from an engine, comprising the steps of:

supplying a current to a catalytic converter and flowing an exhaust gas stream therethrough, said catalytic converter comprising at least one main monolithic catalyst; a heater which is disposed upstream of said at least one main monolithic catalyst or between adjacent main monolithic catalysts, said heater comprising an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which said exhaust gas stream may pass through the honeycomb structure, and being substantially planar and extending through the axial length of said honeycomb structure and substantially parallel to said axial direction and crossing the planes of a plurality of partition walls of the honeycomb structure; and at least two electrodes in electrical contact with said honeycomb structure, wherein said honeycomb structure has a resistance corresponding to a current density of not less than 5 A/mm$^2$ between the electrodes; and reducing a power level supplied to said heater when a temperature of said heater reaches a value at which a main monolithic catalyst is activated.

9. A method of purifying exhaust gases from an engine, comprising the steps of:

supplying a current to a catalytic converter and flowing an exhaust gas stream therethrough, said catalytic converter comprising at least one main monolithic catalyst; a heater which is disposed upstream of said at least one main monolithic catalyst or between adjacent main monolithic catalysts, said heater comprising an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which said exhaust gas stream may pass through the honeycomb structure, and being substantially planar and extending through the axial length of said honeycomb structure and substantially parallel to said axial direction and crossing the planes of a plurality of partition walls of the honeycomb structure wherein said honeycomb structure has a catalyst thereon; and at least two electrodes in electrical contact with said honeycomb structure, wherein said honeycomb structure has a resistance corresponding to a current density of not less than 5 A/mm$^2$ between the electrodes; and reducing a power level supplied to said heater when a temperature of said heater reaches a value at which a main monolithic catalyst or said catalyst carried on said honeycomb structure is activated.

10. A method of purifying exhaust gases from an engine, comprising the steps of:

supplying a current to a catalytic converter and flowing an exhaust gas stream therethrough, said catalytic converter comprising a main monolithic catalyst; a heater disposed downstream of said main monolithic catalyst, said heater comprising an electrically conductive monolithic honeycomb structure having a radial periphery and two ends, including a plurality of passages which are defined by partition walls and extend in an axial direction between the ends, and at least one slit which is formed through said partition walls, said slit being open and unfilled in the area through which said exhaust may pass through the honeycomb structure, and being substantially planar and extending through the axial length of said honeycomb structure and substantially parallel to said axial direction and crossing the planes of a plurality of partition walls of the honeycomb structure said honeycomb structure having a catalyst carried thereon; and at least two electrodes in electrical contact with said honeycomb structure, wherein said honeycomb structure has a resistance corresponding to a current density of not less than 5 A/mm$^2$ between the electrodes; and reducing a power level supplied to said heater when a temperature of said heater reaches a value at which said main monolithic catalyst or said catalyst carried on said honeycomb structure is activated.

* * * * *